US012686581B2

(12) United States Patent
Cho

(10) Patent No.: US 12,686,581 B2
(45) Date of Patent: Jul. 21, 2026

(54) AUTOMATIC TRANSFER SUPPLY EQUIPMENT FOR ROLL-TYPE MATERIAL

(71) Applicant: LG Energy Solution, Ltd., Seoul (KR)

(72) Inventor: Kyung Mo Cho, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 363 days.

(21) Appl. No.: 18/282,439

(22) PCT Filed: Nov. 11, 2022

(86) PCT No.: PCT/KR2022/017702
§ 371 (c)(1),
(2) Date: Sep. 15, 2023

(87) PCT Pub. No.: WO2023/101254
PCT Pub. Date: Jun. 8, 2023

(65) Prior Publication Data

US 2024/0140748 A1 May 2, 2024

(30) Foreign Application Priority Data

Dec. 2, 2021 (KR) ........................ 10-2021-0170702

(51) Int. Cl.
*B65H 19/12* (2006.01)
*B66C 19/00* (2006.01)

(52) U.S. Cl.
CPC ........... *B65H 19/123* (2013.01); *B66C 19/00* (2013.01); *B65H 2301/4171* (2013.01); *B65H 2402/351* (2013.01)

(58) Field of Classification Search
CPC .. B65H 19/30; B65H 19/123; B65H 2801/72; B65H 2301/4171; B65H 2301/413243;
(Continued)

(56) References Cited

U.S. PATENT DOCUMENTS 4,208,019 A * 6/1980 Dusenbery ............. B65H 19/30 242/530.4
4,427,158 A 1/1984 Conrad
(Continued)

FOREIGN PATENT DOCUMENTS

BR 8303077 A 1/1984
CN 1211961 A 3/1999
(Continued)

OTHER PUBLICATIONS

Search Report dated Apr. 23, 25 from the Office Action for Chinese Application No. 202280024097.2 Issued Apr. 24, 2025, pp. 1-3.
(Continued)

*Primary Examiner* — Glenn F Myers
(74) *Attorney, Agent, or Firm* — Lerner David LLP

(57) ABSTRACT

An automatic conveying and feeding facility for roll-type materials. The automatic conveying and feeding facility includes: a roll buffer, a transfer apparatus, and an overhead hoist transport. The roll buffer configured to receive a roll-type material loaded on a carriage in an X-axis direction and convey the received roll-type material on a YZ plane. The transfer apparatus configured to receive the roll-type material from the roll buffer in the X-axis direction, move to a set position on an XY plane in a state in which the roll-type material is loaded thereon, and convey the roll-type material upward in a Z-axis direction. The overhead hoist transport (OHT) configured to receive the roll-type material loaded on the transfer apparatus that has moved upward in the Z-axis direction and having at least one or more rail guided vehicles configured to move to a destination along a trajectory of a conveying rail.

17 Claims, 12 Drawing Sheets

(58) Field of Classification Search
CPC ........... B65H 2301/41732; B65H 2301/41734; B65H 2301/41704; B65C 19/00; B65G 1/0457; B65G 1/06; B65G 1/127; H01M 10/0409; B66C 19/00
See application file for complete search history.

(56) References Cited

U.S. PATENT DOCUMENTS

| | | | | |
|---|---|---|---|---|
| 5,785,801 | A * | 7/1998 | Atkinson .......... B29C 66/81241 156/449 | |
| 6,047,915 | A | 4/2000 | Jaschke | |
| 6,282,867 | B1 * | 9/2001 | Focke .................. B65B 25/148 53/381.4 | |
| 6,402,078 | B1 * | 6/2002 | Brockmueller .... B65H 67/0405 242/473.9 | |
| 6,499,980 | B1 * | 12/2002 | Fledderjohann ..... B29D 30/005 425/38 | |
| 2002/0067979 | A1 | 6/2002 | Ichikawa et al. | |
| 2002/0162913 | A1 | 11/2002 | Brockmueller et al. | |
| 2006/0247111 | A1 | 11/2006 | Pappas | |
| 2014/0311867 | A1 | 10/2014 | Kanno et al. | |
| 2016/0060062 | A1 | 3/2016 | Macura et al. | |
| 2018/0242485 | A1 * | 8/2018 | Kondo ............... H05K 13/0473 | |
| 2020/0126823 | A1 | 4/2020 | Teramoto et al. | |

FOREIGN PATENT DOCUMENTS

| | | | |
|---|---|---|---|
| CN | 106660735 | A | 5/2017 |
| CN | 208413348 | U | 1/2019 |
| CN | 110607431 | A | 12/2019 |
| CN | 211664349 | U | 10/2020 |
| CN | 112397302 | A | 2/2021 |
| CN | 113651156 | A | 11/2021 |
| EP | 0452810 | A1 | 10/1991 |
| JP | S61174004 | A | 8/1986 |
| JP | H03297761 | A | 12/1991 |
| JP | H04286577 | A | 10/1992 |
| JP | H06135638 | A | 5/1994 |
| JP | 2993895 | B2 | 12/1999 |
| JP | 2002234643 | A | 8/2002 |
| JP | 2020064995 | A | 4/2020 |
| KR | 20150072840 | A | 6/2015 |
| KR | 102120154 | B1 | 6/2020 |
| KR | 20200066018 | A | 6/2020 |
| KR | 102171473 | B1 | 10/2020 |
| WO | 2020247767 | A1 | 12/2020 |

OTHER PUBLICATIONS

Extended European Search Report including Written Opinion for Application No. 22901612.6 dated Aug. 22, 2024, pp. 1-5.
International Search Report for Application No. PCT/KR2022/017702 mailed Feb. 27, 23. 3 pages.

* cited by examiner

【FIG. 1】
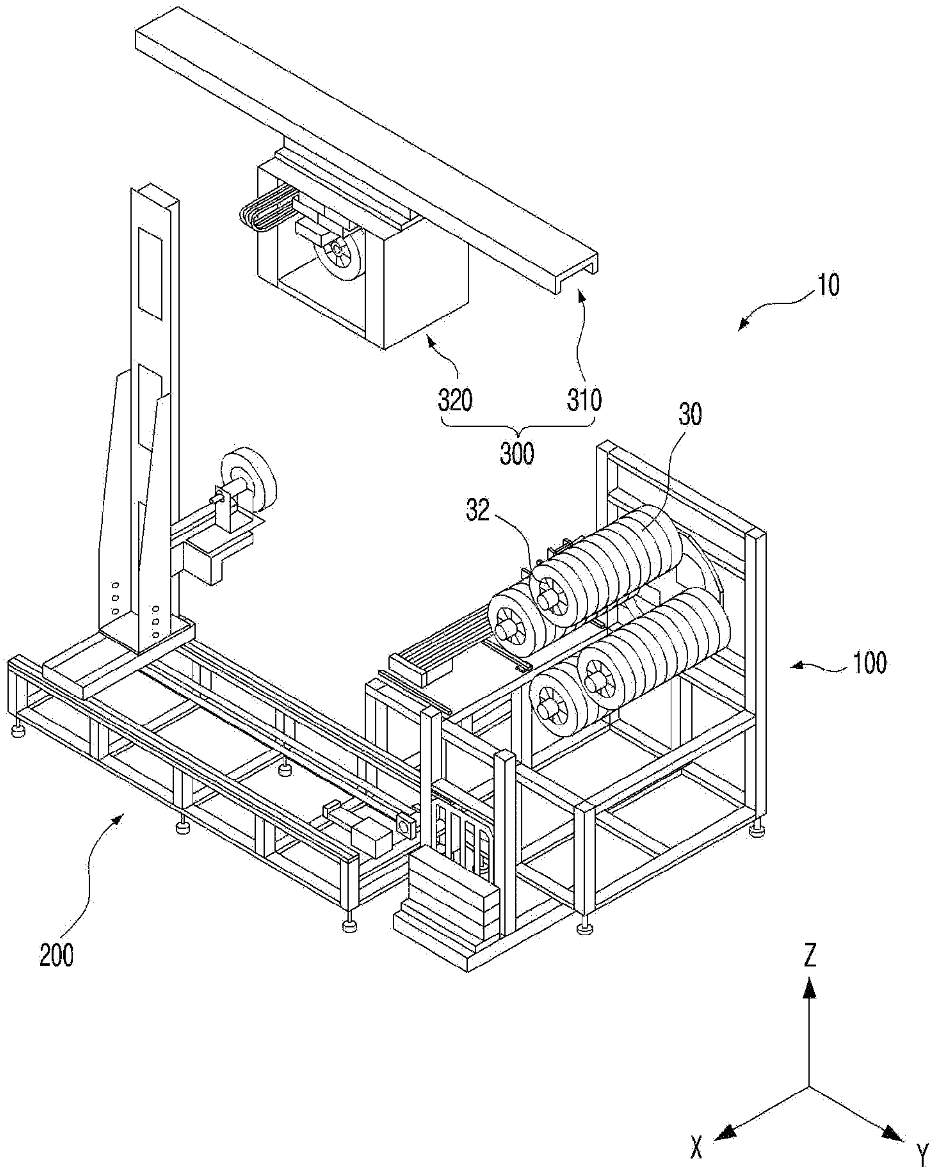

【FIG. 2】
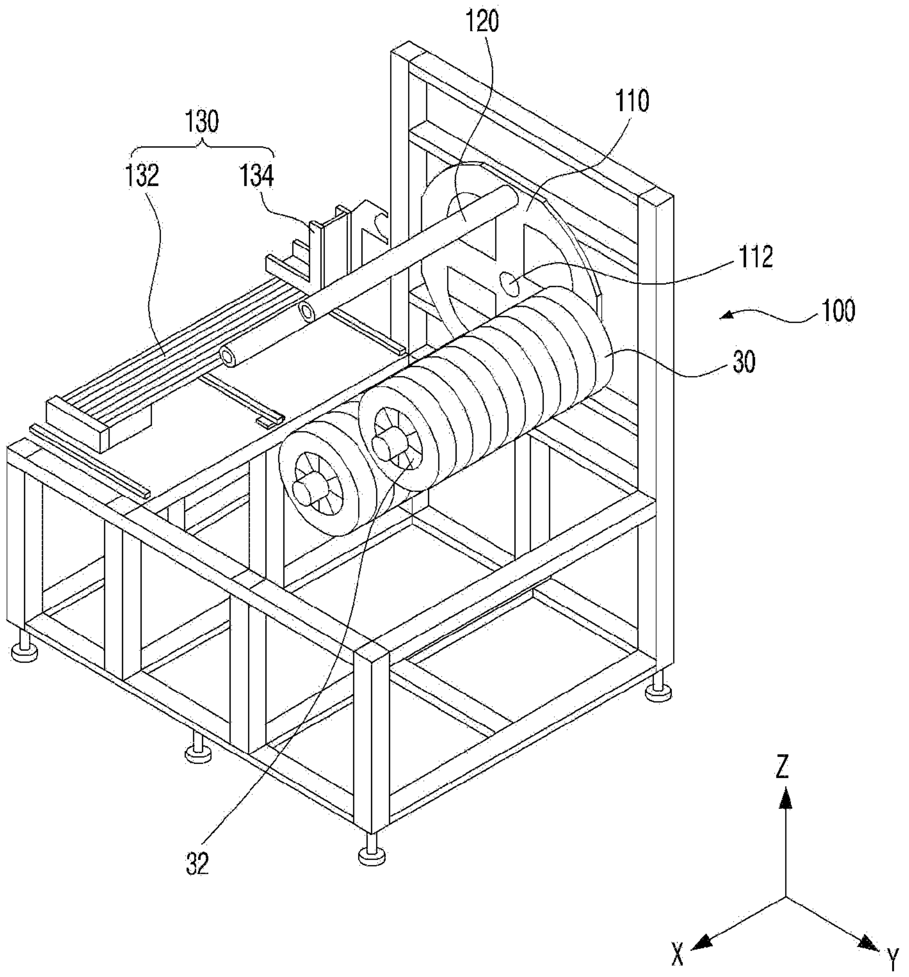

【FIG. 3】
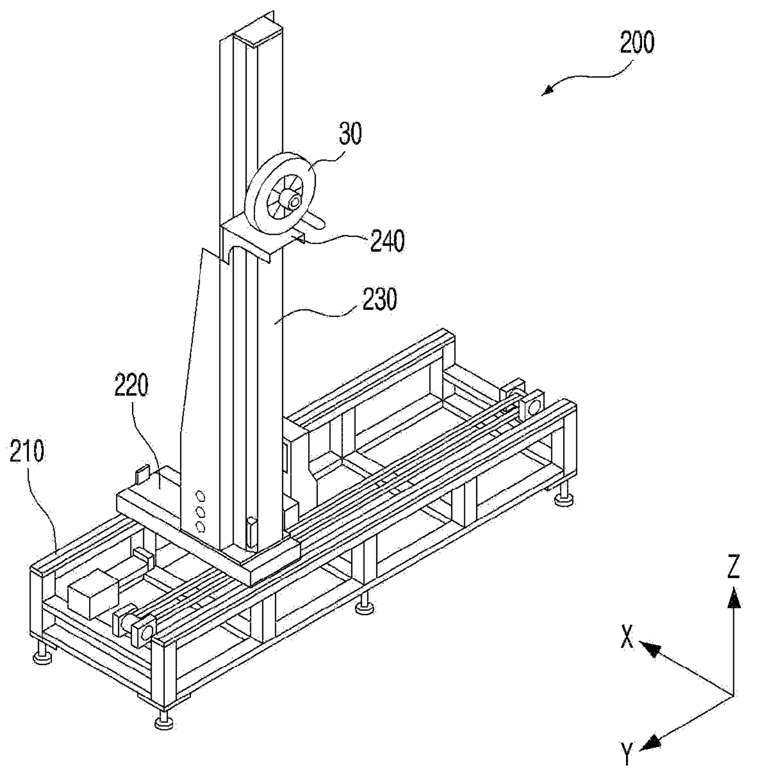

【FIG. 4】
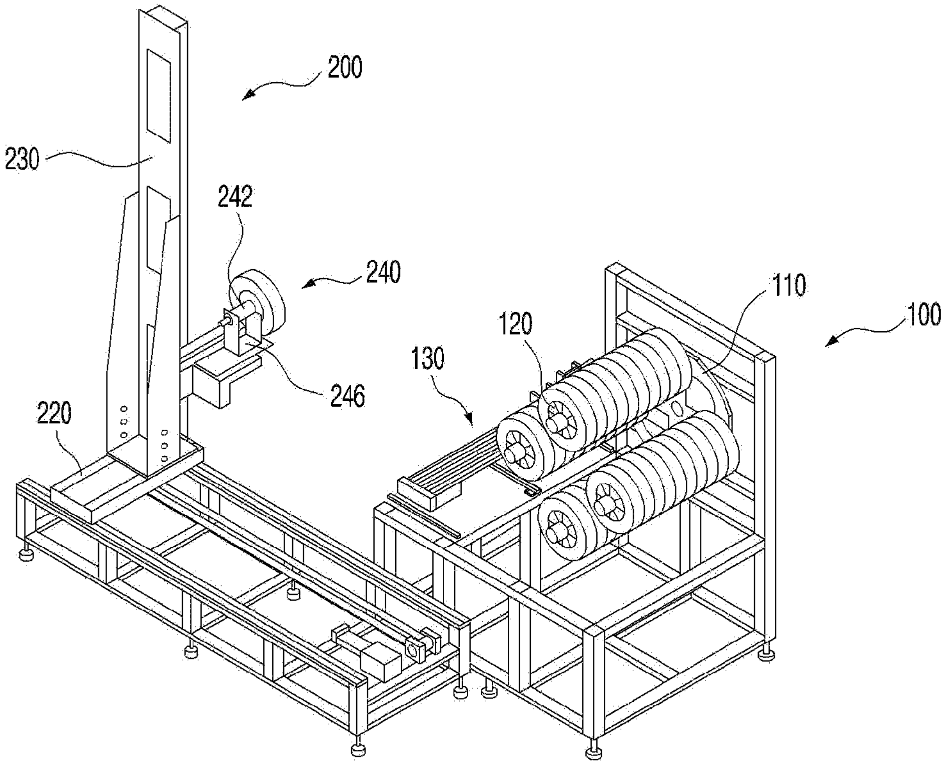

【FIG. 5】
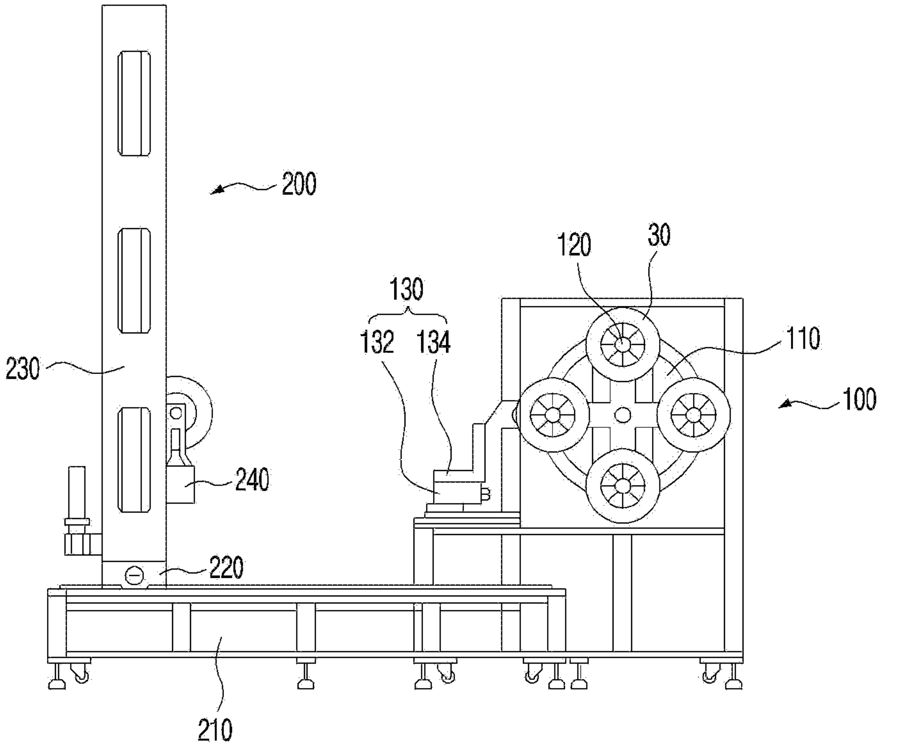

【FIG. 6】
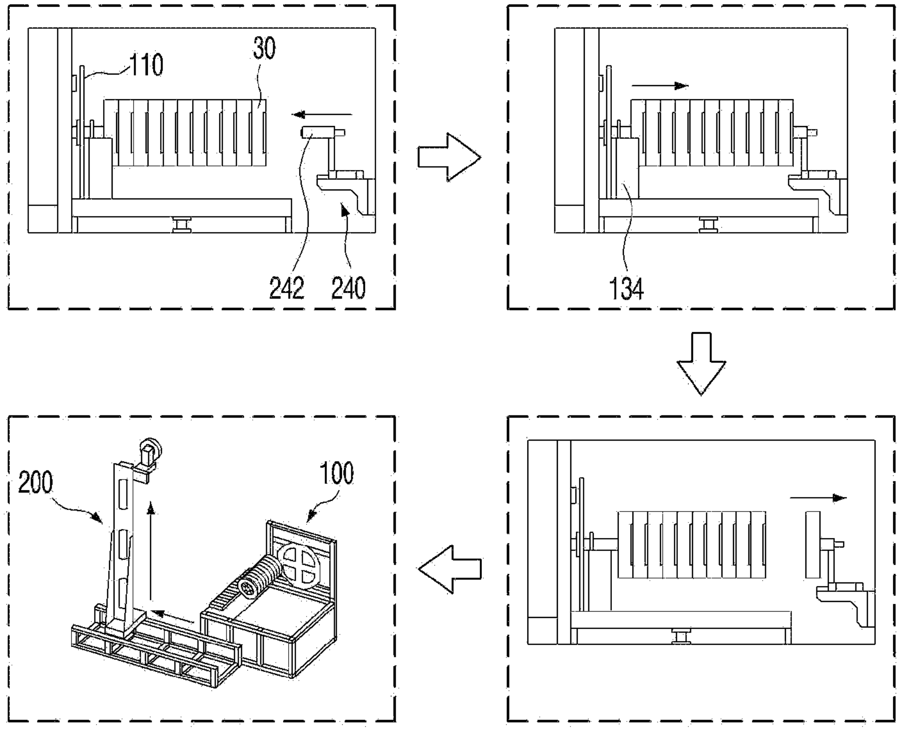

【FIG. 7】
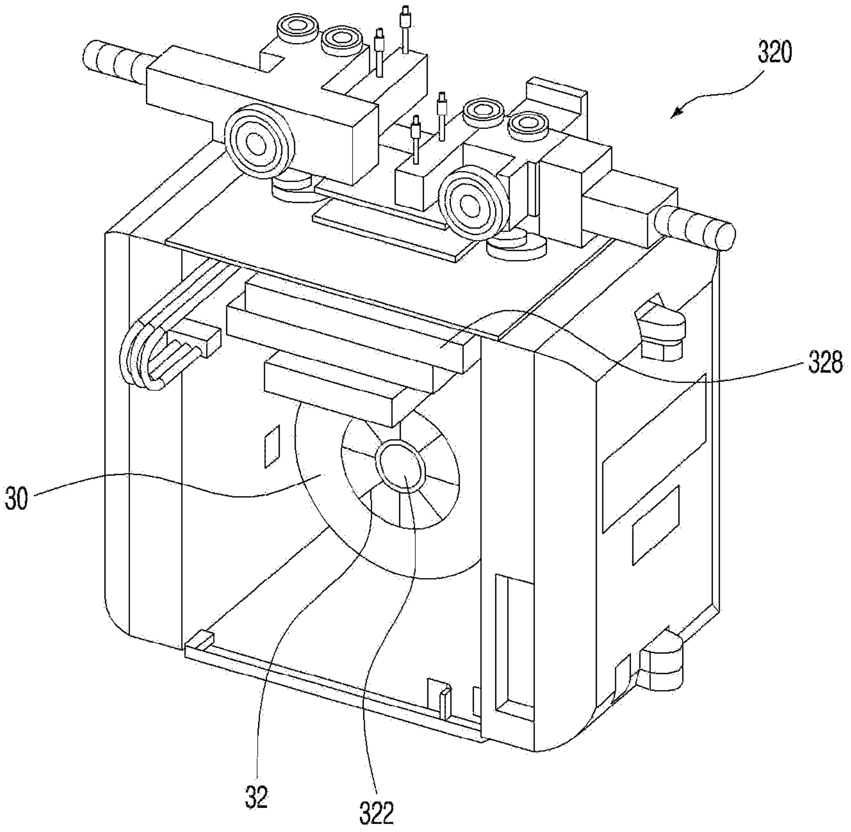

【FIG. 8】
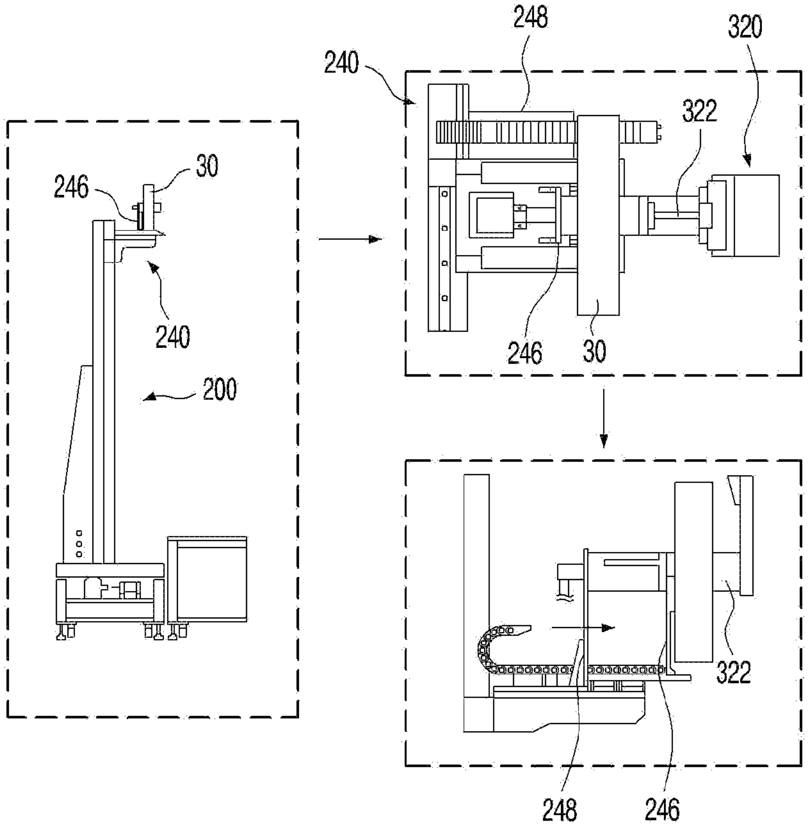

【FIG. 9】
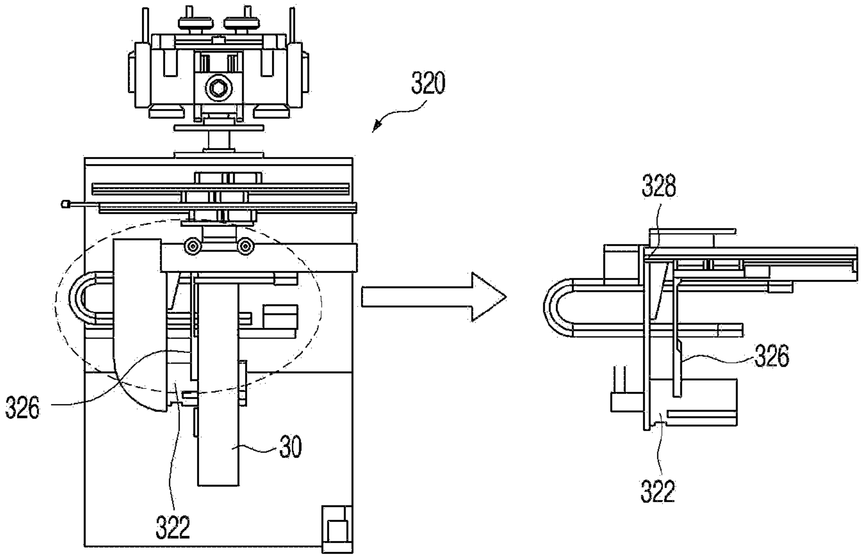

【FIG. 10】
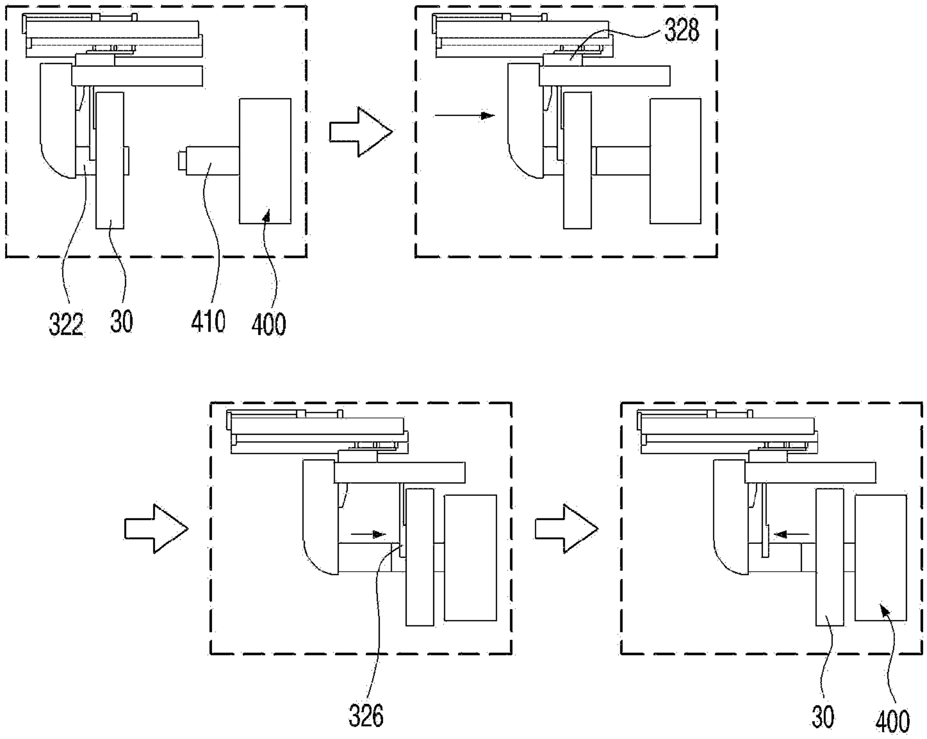

【FIG. 11】
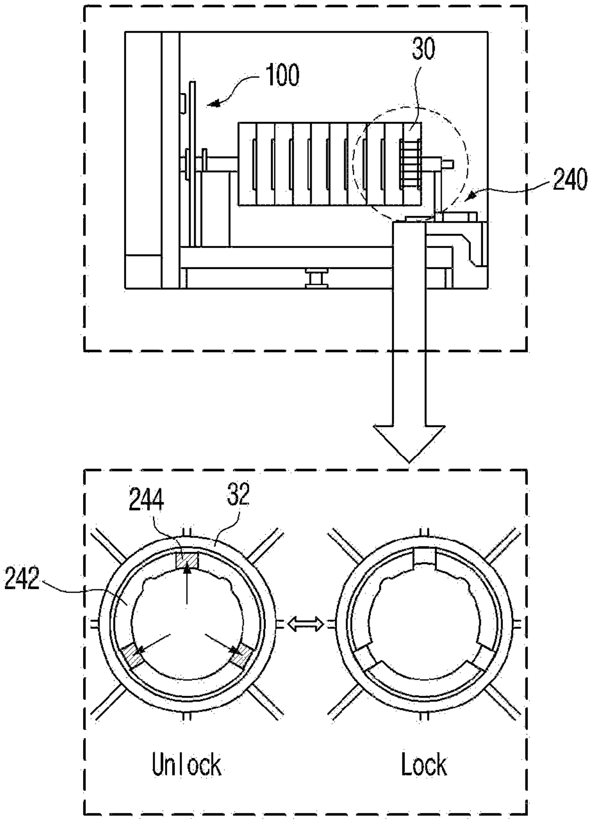

【FIG. 12】
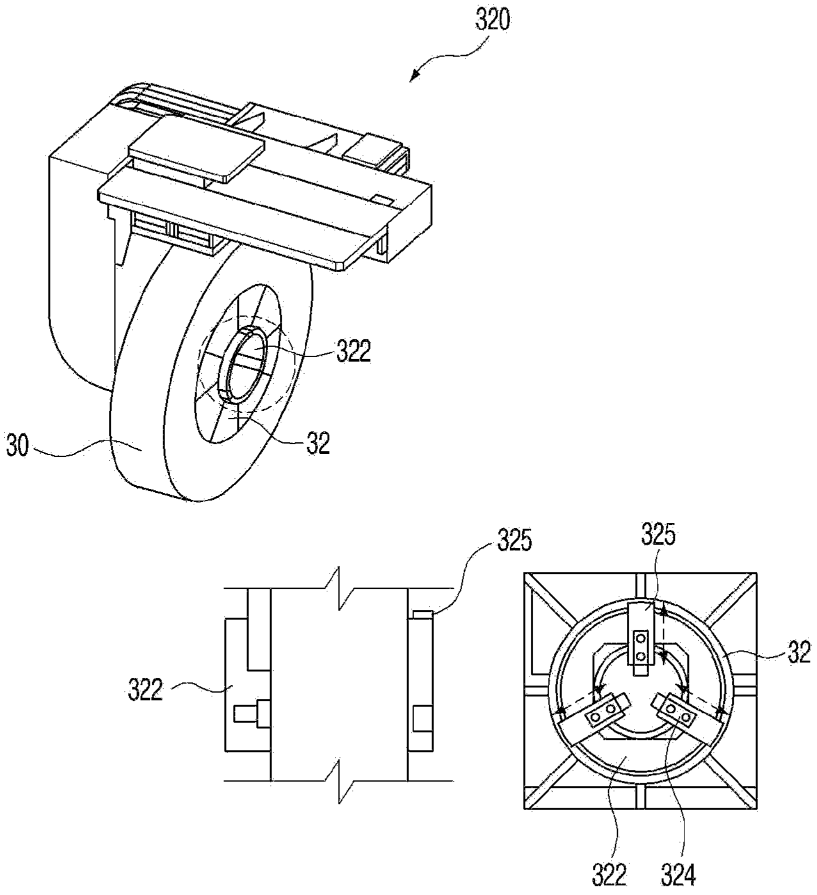

AUTOMATIC TRANSFER SUPPLY EQUIPMENT FOR ROLL-TYPE MATERIAL

CROSS-REFERENCE TO RELATED APPLICATIONS

This application is a national phase entry under 35 U.S.C. § 371 of International Application No. PCT/KR2022/017702 filed on Nov. 11, 2022, which claims the benefit of priority based on Korean Patent Application No. 10-2021-0170702, filed on Dec. 2, 2021, the entire contents of which are incorporated herein by reference.

TECHNICAL FIELD

The present disclosure relates to an automatic conveying and feeding facility for various raw and subsidiary materials provided in rolls, and more particularly, to an automatic conveying and feeding facility which can automatically perform a series of feeding distribution in which roll-type materials are automatically released from a storage and delivered to an overhead hoist transport (OHT), and further, the roll-type materials are received upon the OHT arriving at a facility set as a destination.

BACKGROUND ART

With the development of technology and an increase in demand for mobile devices and a rapid increase in demand for secondary batteries as an energy source to replace fossil fuel, a lot of research has been conducted on secondary batteries that can meet various needs.

In terms of the shape of a battery case, secondary batteries are mainly classified into cylindrical batteries in which an electrode assembly is embedded in a cylindrical metal can, prismatic batteries in which an electrode assembly is embedded in a prismatic metal can, and pouch-type batteries in which an electrode assembly is embedded in a pouch-type case of an aluminum laminate sheet. Also, in terms of the material, lithium secondary batteries, such as lithium-ion batteries and lithium-ion polymer batteries, having high energy density and high discharge voltage and being excellent in terms of output stability are of high demand.

An electrode assembly embedded in a battery case is a power generating device which is made of a positive electrode/separation membrane/negative electrode stacking structure and can be charged and discharged. The electrode assembly is classified into a jelly-roll type electrode assembly which is formed by interposing a separation membrane between long sheet-type positive and negative electrodes on which an active material is applied and winding the positive and negative electrodes and the separation membrane and a stack-type electrode assembly which is formed by sequentially stacking a plurality of positive and negative electrodes, each having a predetermined size, in a state in which a separation membrane is interposed therebetween. Also, as an electrode assembly having a further advanced structure which is a form in which the jelly-roll type electrode assembly and the stack-type electrode assembly are mixed, a stack/folding type electrode assembly which is formed by folding a full cell having a positive electrode/separation membrane/negative electrode structure of a predetermined unit size or a bicell having a positive electrode (negative electrode)/separation membrane/negative electrode (positive electrode)/separation membrane/positive electrode (negative electrode) structure of a predetermined unit size using a long-length, continuous separation film has also been developed.

Here, sheets of a positive electrode, a separation membrane, and a negative electrode constituting an electrode assembly including a stacking structure of a unit electrode are provided in rolls, and raw and subsidiary material sheets are continuously provided in a roll-to-roll manner between an unwinder and a rewinder and processed.

When sheets provided in rolls are collectively referred to as roll-type materials, a series of manufacturing processes starts with mounting the roll-type materials on a winder facility. Accordingly, for the manufacturing processes to be smoothly performed without a halt, the roll-type materials should be provided and mounted on the winder facility in a timely manner.

However, in the past, roll-type materials have been manually loaded from a warehouse using a carriage and then transported to the corresponding winder facility and manually input to the facility. Here, several roll-type materials are required per reference time for each winder facility, and it is a heavy task for a worker who operates the facility to also transport the roll-type materials.

When inputting of roll-type materials is rushed to handle a heavy workload, raw and subsidiary materials may be damaged while being handled, and quality problems may occur due to insufficient manufacturing management, which is the main task. Also, when tasks are rushed, there is a risk of accidents due to errors in handling the roll-type materials which are heavy objects. Therefore, the need to automate a series of processes including releasing, conveying, and inputting of roll-type materials has emerged.

RELATED ART DOCUMENT

Patent Document (Patent Document 1) Japanese Patent Registration No. 2993895 (Date of Registration: Oct. 22, 1999)

DISCLOSURE

Technical Problem

An object of the present disclosure is to provide an automatic conveying and feeding facility for roll-type materials which can automatically perform a series of processes including loading, releasing, conveying, and inputting of the roll-type materials.

Technical Solution

The present disclosure provides an automatic conveying and feeding facility for roll-type materials. In one embodiment, an automatic conveying and feeding facility for roll-type materials includes: a roll buffer configured to receive a roll-type material loaded on a carriage in an X-axis direction and convey the received roll-type material on a YZ plane; a transfer configured to receive the roll-type material from the roll buffer in the X-axis direction, move to a set position on an XY plane in a state in which the roll-type material is loaded thereon, and convey the roll-type material upward in a Z-axis direction; and an overhead hoist transport (OHT) configured to receive the roll-type material loaded on the transfer that has moved upward in the Z-axis direction and having at least one or more rail guided vehicles configured to move to a destination along a trajectory of a conveying rail.

In a specific embodiment, movement of the roll-type material between the roll buffer and the transfer and between the transfer and the rail guided vehicle may occur in a rod-to-rod manner.

Accordingly, a rod configured to be inserted into a hollow hub of the roll-type material may be provided on each of the roll buffer, the transfer, and the rail guided vehicle.

Further, a pusher unit configured to push the roll-type material loaded through the rod of the hollow hub may be provided on each of the roll buffer, the transfer, and the rail guided vehicle.

In one embodiment, movement of the roll-type material between the roll buffer and the transfer and between the transfer and the rail guided vehicle may occur as, in a state in which the rods provided on the roll buffer, the transfer, and the rail guided vehicle are aligned with each other, the pusher unit pushes the roll-type material loaded through the rod of the hollow hub.

In a specific embodiment, the roll buffer may include a turntable disposed on the YZ plane and at least two or more rods disposed on a circumference of the turntable, the turntable may rotate about a rotating shaft in the X-axis direction that passes through a center of the circumference, and the roll-type material loaded through the at least two or more rods on the turntable may approach the transfer due to rotation of the turntable.

Here, a plurality of roll-type materials may be loaded through the at least two or more rods on the turntable.

Also, the pusher unit provided in the roll buffer may include a pusher frame configured to linearly move in a Y-axis direction and a pusher configured to linearly move in the X-axis direction on the pusher frame, and the pusher may push a rearmost portion of the plurality of roll-type materials loaded through the at least two or more rods on the turntable so that one foremost roll-type material is released each time.

Also, in a specific embodiment, the transfer may include: a base frame extending in the Y-axis direction; a middle frame configured to linearly move in the Y-axis direction on the base frame; a column configured to linearly move in the X-axis direction on the middle frame and extending in the Z-axis direction; and a conveying unit configured to linearly move in the Z-axis direction on the column, having a rod, and on which the pusher unit configured to push a rear of the roll-type material loaded through the rod of the hollow hub is mounted.

Here, the conveying unit may linearly move in the Z-axis direction, at least by a distance between the rod of the roll buffer and the rod of the rail guided vehicle.

Also, in a specific embodiment of the rail guided vehicle, the pusher unit may be provided at a rear of the rod of the rail guided vehicle and push the rear of the roll-type material loaded through the rod of the hollow hub.

Further, the conveying unit may further include a slider configured to linearly move the rod of the conveying unit and the pusher unit together, and the rod of the conveying unit that has linearly moved due to the slider may be docked at the rod of the roll buffer or the rod of the rail guided vehicle and connected thereto.

Meanwhile, in one embodiment, a chuck means configured to press an inner surface of the hollow hub of the loaded roll-type material may be provided in the rod of the conveying unit.

Also, the automatic conveying and feeding facility may further include a winder port disposed on the trajectory of the conveying rail, and the winder port may have a rod which is able to be linked to the rod of the rail guided vehicle.

Also, the rail guided vehicle may further include a slider configured to linearly move the rod of the rail guided vehicle and the pusher unit together, and the rod of the rail guided vehicle that has linearly moved due to the slider may be docked at the rod of the winder port and connected thereto.

In one embodiment, a chuck means configured to press the inner surface of the hollow hub of the loaded roll-type material may be provided in the rod of the rail guided vehicle.

Here, a protruding step forming a catching step for the hollow hub may be provided on an end portion of the chuck means provided in the rod of the rail guided vehicle.

Advantageous Effects

Using an automatic conveying and feeding facility of the present disclosure, by loading roll-type materials in large amounts on a roll buffer, a sufficient amount of time can be secured until the materials are exhausted on site, and the roll-type materials can be automatically fed from the roll buffer to a destination in a rod-to-rod manner. Therefore, by applying the automatic conveying and feeding facility of the present disclosure, a worker operating a winder facility can be free from a heavy incidental task of having to also transport the roll-type materials and thus can concentrate more on a main task, and a risk of damage to the roll-type materials during a process of moving the roll-type materials is significantly reduced.

Also, the automatic conveying and feeding facility of the present disclosure further includes various elements such as a slider and a chuck means. In this way, efficiency of conveying and feeding the roll-type materials in the rod-to-rod manner can be improved, and the facility can be stably operated.

Advantageous effects of the present disclosure are not limited to those mentioned above, and other unmentioned advantageous effects should be clearly understood by those of ordinary skill in the art from the detailed description below.

BRIEF DESCRIPTION OF THE DRAWINGS

FIG. 1 is a view illustrating the overall configuration of an automatic conveying and feeding facility for roll-type materials according to the present disclosure.

FIG. 2 is a view illustrating a roll buffer that the present disclosure includes.

FIG. 3 is a view illustrating a transfer that the present disclosure includes.

FIG. 4 is a view illustrating the arrangement of the roll buffer of FIG. 2 and the transfer of FIG. 3.

FIG. 5 is a front view of the arrangement of the roll buffer and the transfer.

FIG. 6 is a view illustrating conveying of roll-type materials in a rod-to-rod manner that is performed between the roll buffer and the transfer.

FIG. 7 is a view illustrating a rail guided vehicle that the present disclosure includes.

FIG. 8 is a view illustrating conveying of roll-type materials in a rod-to-rod manner that is performed between the transfer and the rail guided vehicle.

FIG. 9 is a view illustrating configurations of a pusher unit and a slider provided in the rail guided vehicle of FIG. 7.

FIG. 10 is a view illustrating conveying of roll-type materials in a rod-to-rod manner that is performed between the rail guided vehicle and a winder port.

FIG. 11 is a view illustrating a chuck means provided in a rod of a conveying unit of the transfer.

FIG. 12 is a view illustrating a chuck means provided in a rod of the rail guided vehicle.

BEST MODE

Since various modifications may be made to the present disclosure and the present invention may have various embodiments, specific embodiments will be described in detail below.

However, this does not limit the present invention to the specific embodiments, and all modifications, equivalents, or substitutes included in the spirit and technical scope of the present disclosure should be understood as belonging to the present invention.

In the present disclosure, terms such as "include" or "have" should be understood as specifying that features, numbers, steps, operations, elements, components, or combinations thereof are present and not as precluding the possibility of the presence or addition of one or more other features, numbers, steps, operations, elements, components, or combinations thereof in advance.

Also, in the present disclosure, when a part such as a layer, a film, an area, or a plate is described as being "on" another part, this includes not only a case where the part is "directly on" the other part, but also a case where still another part is present therebetween. On the contrary, when a part such as a layer, a film, an area, or a plate is described as being "under" another part, this includes not only a case where the part is "directly under" the other part, but also a case where still another part is present therebetween. Also, in the present application, being disposed "on" may include not only being disposed on an upper portion, but also being disposed on a lower portion.

The present disclosure relates to an automatic conveying and feeding facility for roll-type materials.

In one embodiment, the automatic conveying and feeding facility for roll-type materials includes a roll buffer, a transfer, and an overhead hoist transport (OHT).

The roll buffer receives a roll-type material loaded on a carriage in an X-axis direction and conveys the received roll-type material on a YZ plane. Also, the transfer receives the roll-type material from the roll buffer in the X-axis direction, moves to a set position on an XY plane in a state in which the received roll-type material is loaded thereon, and conveys the roll-type material upward in a Z-axis direction. In a subsequent process, a rail guided vehicle included in the OHT receives the roll-type material loaded on the transfer that has moved upward in the Z-axis direction and moves to a destination along a trajectory of a conveying rail, and the rail guided vehicle may be provided as a plurality of rail guided vehicles.

In a specific embodiment, movement of the roll-type material between the roll buffer and the transfer and between the transfer and the rail guided vehicle occurs in a rod-to-rod manner. A rod refers to a rod member configured to be inserted into a hollow hub of the roll-type material, and a hollow hub that can be mounted on a winder facility is provided in a center of the roll-type material. Considering that the hollow hub is provided in the roll-type material and a rod corresponding to the hollow hub is provided in the winder facility, the present disclosure is configured so that a series of automated processes including loading, releasing, conveying, and inputting of roll-type materials is performed in a rod-to-rod manner.

DETAILED DESCRIPTION

Hereinafter, specific embodiments of an automatic conveying and feeding facility for roll-type materials (hereinafter, briefly referred to as an "automatic conveying and feeding facility") of the present disclosure will be described with reference to the accompanying drawings.

FIG. 1 is a view illustrating the overall configuration of an automatic conveying and feeding facility 10 according to the present disclosure. Here, in describing embodiments of the present invention, for clear understanding of the disclosure, the same term will be used to refer to elements having the same function, but different reference numerals will be used for the elements referred to by the same term in order to clearly distinguish the elements.

Referring to FIG. 1, the automatic conveying and feeding facility 10 of the present disclosure includes a roll buffer 100, a transfer 200, and an overhead hoist transport (OHT) 300. As described above, in the present disclosure, movement of a roll-type material 30 between the roll buffer 100 and the transfer 200 and between the transfer 200 and a rail guided vehicle 320 occurs in a rod-to-rod manner. The rod-to-rod manner may be more clearly understood from the description of specific embodiments of each of the elements.

FIG. 2 is a view illustrating the roll buffer 100 that embodiments of the present invention include. The roll buffer 100 is where the roll-type material 30 is temporarily stored, and the roll buffer 100 holds a certain quantity of roll-type materials 30 manually released from a warehouse using a carriage. In this way, the roll buffer 100 serves to prevent the roll-type materials 30 used in a winder facility from being exhausted within a short time.

The roll buffer 100 receives the roll-type material 30 loaded on the carriage 20 in an X-axis direction (based on the coordinate axis of FIG. 1) and conveys the received roll-type material 30 on a YZ plane.

In a specific embodiment shown in FIG. 2, the roll buffer 100 includes a turntable 110 disposed on the YZ plane and at least two or more rods 120 disposed on a circumference of the turntable 110. The rods 120 are in the X-axis direction, and a large quantity of roll-type materials 30 brought using the carriage 20 are loaded in piles through each rod 120. In the illustrated example, four rods 120 are provided, and a maximum of ten roll-type materials 30 are loaded per each rod 120. For the roll buffer 100 to truly play its role as a buffer, as many rods 120 as possible may be provided.

The turntable 110 rotates about a rotating shaft 112 in the X-axis direction that passes through a center of a circumference formed by the plurality of rods 120, and the roll-type materials 30 loaded through the rods 120 approach the transfer 200 due to rotation of the turntable 110. That is, each rod 120 may sequentially approach the transfer 200 through 90° rotation (an angle obtained by dividing 360° by the number of rods) of the turntable 110 disposed on the YZ plane, and after all the roll-type materials 30 loaded through one rod 120 are released, the turntable 110 is rotated to provide roll-type materials 30 loaded through a subsequent rod 120 to the transfer 200.

The method using the turntable 110 has various advantages such as allowing a plurality of rods 120 to be disposed in a limited space, allowing roll-type materials 30 to be continuously supplied sequentially through rotation, and allowing roll-type materials 30 to be additionally loaded through an empty rod 120 before all the roll-type materials 30 on the turntable 110 are exhausted.

FIG. 3 is a view illustrating the transfer 200 that embodiments of the present invention include. The transfer 200 receives the roll-type material 30 from the roll buffer 100 in the X-axis direction, moves to a set position on an XY plane in a state in which the received roll-type material 30 is loaded thereon, and conveys the roll-type material 30 upward in a Z-axis direction. In a specific embodiment shown in FIG. 3, the transfer 200 includes a base frame 210, a middle frame 220, a column 230, and a conveying unit 240.

The base frame 210 placed on a floor surface extends in a Y-axis direction, and the middle frame 220 linearly moves in the Y-axis direction on the base frame 210. Traveling of the middle frame 220 in the Y-axis direction is implemented by general configurations such as a linear motor and a guide, and a transverse distance (based on the drawing) from the roll buffer 100 is adjusted by the traveling of the middle frame 220 in the Y-axis direction.

The column 230 is a column member disposed on the middle frame 220 and extending in the Z-axis direction. The column 230 linearly moves in the X-axis direction on the middle frame 220. Traveling of the column 230 in the X-axis direction is also implemented by general configurations such as a linear motor and a guide, and a longitudinal distance (based on the drawing) from the roll buffer 100 is adjusted by the traveling of the column 230 in the X-axis direction.

Also, the conveying unit 240 configured to linearly move in the Z-axis direction is coupled onto the column 230. Traveling of the conveying unit 240 is also implemented by a linear motor or the like, and a short rod 242 corresponding to the rod 120 of the roll buffer 100 is provided in the conveying unit 240 which moves in a height direction.

The multiple linear movements that occur from the middle frame 220 to the conveying unit 240 eventually enable three-axis movements in the X-axis, Y-axis, and Z-axis directions, and in this way, the conveying unit 240 may be positioned anywhere in the three-dimensional coordinate system within a movement range.

FIG. 4 is a view illustrating the arrangement of the roll buffer 100 of FIG. 2 and the transfer 200 of FIG. 3, and FIG. 5 is a front view of the arrangement of the roll buffer 100 and the transfer 200. The rods 120 provided in the roll buffer 100 are positioned within a radius of rotation of the turntable 110, and the conveying unit 240 of the transfer may approach the loaded roll-type materials 30 of the roll buffer 100 due to the three-axis movements. Here, of course, longitudinal and transverse intervals between the roll buffer 100 and the transfer 200 may be within a range in which the conveying unit 240 moves on the XY plane.

As described above, in the automatic conveying and feeding facility 10 of the present disclosure, movement of the roll-type material 30 between the roll buffer 100 and the transfer 200 occurs in the rod-to-rod manner. That is, the rod 120 provided in the roll buffer 100 and the rod 242 provided in the transfer 200 are coaxially aligned with each other, and the roll-type material 30 moves from the roll buffer 100 to the conveying unit 240 of the transfer 200 through the aligned rods 120 and 242. Here, embodiments of the present invention includes pusher units 130, 246, and 326 configured to provide force that allows the roll-type material 30 to move.

FIG. 6 is a view illustrating conveying of roll-type materials 30 in the rod-to-rod manner that is performed between the roll buffer 100 and the transfer 200. In the conveying of the roll-type materials 30 in the rod-to-rod manner that is performed between the roll buffer 100 and the transfer 200, since the roll-type materials 30 are loaded in the roll buffer 100, the pusher unit 130 provided in the roll buffer 100 moves the roll-type materials 30.

The pusher unit 130 provided in the roll buffer 100 is well-shown in FIG. 2. Referring to the drawing, the pusher unit 130 of the roll buffer 100 includes a pusher frame 132 configured to linearly move in the Y-axis direction and a pusher 134 configured to linearly move in the X-axis direction on the pusher frame 132. The pusher frame 132 adjusts a distance between the pusher unit 130 and the rod 120. That is, the pusher frame 132 is moved rearward in a negative Y-axis direction to prevent interference during rotation of the turntable 110 and is moved forward in the Y-axis direction to allow the pusher 134 to approach the roll-type material 30 during release of the roll-type material 30. In this way, the distance is adjusted.

Referring back to FIG. 6, the pusher unit 130 approaches the rod 120 of the turntable 110, and the pusher 134 pushes a rearmost portion of the plurality of roll-type materials 30 loaded through the rod 120 on the turntable 110 so that one foremost roll-type material 30 is released each time. Here, the rod 242 mounted on the conveying unit 240 that forms an end of the transfer 200 is aligned so that a three-dimensional position of the rod 242 is coaxial with the rod 120 with respect to which the pusher 134 of the roll buffer 100 is operating. Accordingly, one foremost roll-type material 30 pushed out by the pusher 134 of the roll buffer 100 moves to the rod 242 of the conveying unit 240.

The conveying unit 240 of the transfer 200 that has received the roll-type material 30 loaded in the roll buffer 100 moves so that a three-dimensional position of the conveying unit 240 moves toward the rail guided vehicle 320 of the OHT 300, that is, moves upward along the column 230.

FIG. 7 is a view illustrating the rail guided vehicle 320. The illustrated rail guided vehicle 320 is an automated electric vehicle configured to move to a set or input destination along a trajectory of a conveying rail 310 installed on a ceiling, and a handling means which can receive a material from a point of departure and deliver the received material to a destination is provided in the rail guided vehicle 320.

A rod 322 and the pusher unit 326 are provided as material handling means in the rail guided vehicle 320 of the present disclosure, and a state in which the roll-type material 30 is loaded through the rod 322 is illustrated in FIG. 7. Here, a body frame, a driving unit, and the like are also illustrated as being provided in the rail guided vehicle 320 of FIG. 7, but since such configurations are known elements, detailed descriptions thereof will be omitted.

Referring to FIG. 1, the rail guided vehicle 320 receives the roll-type material 30 loaded on the conveying unit 240 of the transfer 200 that has moved upward in the Z-axis direction and moves to a destination along the trajectory of the conveying rail 310. Although omitted in the drawing, the conveying rail constitutes a circulating trajectory which starts from the transfer 200, which is a point of departure, and returns to the transfer 200 via a destination, such as the winder facility.

FIG. 8 is a view illustrating conveying of roll-type materials 30 in the rod-to-rod manner that is performed between the transfer 200 and the rail guided vehicle 320. Since the conveying unit 240 of the transfer 200 is a medium which releases the roll-type material 30 from the roll buffer 100 disposed below the conveying unit 240 and delivers the roll-type material 30 to the rail guided vehicle 320 disposed above the conveying unit 240, the conveying unit 240 may be able to linearly move in the Z-axis direction, at least by a distance (height) between the rod 120 of the roll buffer 100 and the rod 322 of the rail guided vehicle 320.

Referring to FIG. 8, the conveying of the roll-type materials 30 in the rod-to-rod manner that is performed between the transfer 200 and the rail guided vehicle 320 is conceptually equivalent to the conveying of the roll-type materials 30 in the rod-to-rod manner that is performed between the roll buffer 100 and the transfer 200 as in FIG. 6. The conveying in FIG. 8 is different from the conveying in FIG. 6 only in that, since the roll-type material 30 is loaded on the conveying unit 240, the pusher unit 246 provided in the conveying unit 240 operates.

The conveying unit 240 which has moved upward in the Z-axis direction moves to a set point in the XYZ coordinate system so that the rod 242 of the conveying unit 240 through which the roll-type material 30 is loaded becomes coaxial with the rod 322 of the rail guided vehicle 320. By the pusher unit 246 of the conveying unit 240 pushing the rear of the roll-type material 30 in a state in which the two rods 242 and 322 are aligned with each other, the roll-type material 30 is conveyed in the rod-to-rod manner between the transfer 200 and the rail guided vehicle 320.

As described above, using the automatic conveying and feeding facility 10 of the present disclosure, by loading the roll-type materials 30 in large amounts on the roll buffer 100, a sufficient amount of time can be secured until the materials are exhausted on site, and the roll-type materials 30 can be automatically fed from the roll buffer 100 to a destination in the rod-to-rod manner.

Therefore, by applying the automatic conveying and feeding facility 10 of the present disclosure, a worker operating the winder facility can be free from a heavy incidental task of having to also transport the roll-type materials 30 and thus can concentrate more on a main task, and a risk of damage to the roll-type materials 30 during a process of moving the roll-type materials 30 is significantly reduced.

FIG. 8 is a view illustrating the conveying of the roll-type materials 30 in the rod-to-rod manner that is performed between the transfer 200 and the rail guided vehicle 320. Looking at the right drawing of FIG. 8, the conveying unit 240 of the transfer 200 may further include a slider 248 configured to linearly move the rod 242 and the pusher unit 246 together.

The rod 242 of the conveying unit 240 that has linearly moved due to the slider 248 may be docked at the rod 120 of the roll buffer 100 or the rod 322 of the rail guided vehicle 320 and connected thereto. After the rod 242 is docked, the roll-type material 30 is moved by the pusher unit 246, and the slider 248 moves the rod 242 and the pusher unit 246 rearward to their original positions after the delivery of the roll-type material 30 is completed.

In this way, in the conveying of the roll-type materials 30 in the rod-to-rod manner, beyond simply allowing the rods 242 and 322, which face each other, to become coaxial with each other, the slider 248 connects the rods 242 and 322 to each other so that the rods 242 and 322 constitute a single shaft. In this way, the slider 248 ensures that the roll-type material 30 stably moves without being caught in the middle or falling.

In particular, since the conveying of the roll-type materials 30 in the rod-to-rod manner that is performed between the conveying unit 240 and the rail guided vehicle 320 is performed at a high place, when a problem occurs in movement of the roll-type material 30, it is difficult to address the problem, and there is a high concern for accidents due to falling of the roll-type material 30. Also, since there is also an effect of substantially extending an effective length of the rod 242 by the slider 248, it is possible to obtain an additional effect of reducing the risk of unexpected interference or collision by shortening the rod 242 of the conveying unit 240 that performs three-dimensional motion.

FIG. 9 is a view illustrating configurations of the pusher unit 326 and a slider 328 provided in the rail guided vehicle 320. The slider 328 provided in the rail guided vehicle 320 also linearly moves the rod 322 and the pusher unit 326 together. The configuration in which the slider 328 is added to the rail guided vehicle 320 is a result of taking into consideration an embodiment in which a winder port 400 is provided as a docking system in various winder facilities (not illustrated) which handle the roll-type materials 30.

The winder port 400 is illustrated in FIG. 10 and corresponds to a destination where the roll-type material 30 transported by the rail guided vehicle 320 is received. A rod 410 corresponding to a hollow hub 32 of the roll-type material 30 is provided in the winder port 400. Here, since a configuration for mounting the roll-type material 30 received at the winder port 400 on a winder facility (not illustrated) is beyond the scope of the present disclosure, description thereof will be omitted.

FIG. 10 is a view illustrating conveying of roll-type materials 30 in the rod-to-rod manner that is performed between the rail guided vehicle 320 and the winder port 400. In the present disclosure, for conveying of roll-type materials 30 in the rod-to-rod manner, equivalent structures and manners are consistently maintained, and the rod 410 of the winder port 400 that is matched with a movement trajectory of the rail guided vehicle 320 is at a direction and height that allow the rod 410 to be coaxial with the rod 322 of the rail guided vehicle 320.

As shown in FIG. 9, the rail guided vehicle 320 further includes the slider 328 configured to linearly move the rod 322 and the pusher unit 326 together. Also, as shown in FIG. 10, the rod 322 of the rail guided vehicle 320 that has linearly moved due to the slider 328 may be docked at the rod 410 of the winder port 400 and connected thereto, and after the rod 322 is docked, the pusher unit 326 pushes the roll-type material 30 and moves the roll-type material 30 to the rod 410 of the winder port 400. Also, the slider 328 moves the rod 322 and the pusher unit 326 rearward to their original positions after the delivery of the roll-type material 30 is completed.

Meanwhile, an additional means for stably maintaining the movement of the roll-type material 30 that occurs at a high place may be further provided. The means are chuck means 244 and 324 and refer to known means in which a plurality of jaws moving in a radial direction fix a member. In one exemplary embodiment of the present invention, a universal chuck having three jaws which are operated electrically or pneumatically is used.

FIG. 11 is a view illustrating the chuck means 244 provided in the rod 242 of the conveying unit 240 of the transfer 200. The illustrated chuck means 244 shows an example in which the rod 242 is formed to be hollow and three jaws are disposed in a space of the rod 242. The chuck means 244 provided in the rod 242 of the conveying unit 240 presses an inner surface of the hollow hub 32 of the roll-type material 30, thus firmly fixing the roll-type material 30 to the rod 242. The fixed state of the roll-type material 30 fixed by the chuck means 244 is stably maintained even during three-dimensional movement of the conveying unit 240.

FIG. 12 is a view illustrating the chuck means 324 provided in the rod 322 of the rail guided vehicle 320. The chuck means 324 of the rail guided vehicle 320 basically has a structure equivalent to the structure of the chuck means 244 of the transfer 200, and three jaws press the inner surface of the hollow hub 32 of the roll-type material 30.

However, since the rail guided vehicle 320 often receives various inertial forces, such as acceleration, braking, and a centrifugal force when traveling in a curved trajectory while moving along the trajectory of the conveying rail 310, the roll-type material 30 may be more reliably fixed. To this end, the chuck means 324 of the rail guided vehicle 320 has a protruding step 325 provided on an end portion thereof to form a catching step for the hollow hub 32. By the protruding step 325 restraining the hollow hub 32 from falling to the outside of the rod 322, the fixed state of the roll-type material 30 is reliably ensured even when the rail guided vehicle 320 travels in a complex trajectory.

Some of the embodiments of the present invention have been described in detail above using the drawings, embodiments, or the like. However, configurations illustrated or described in the drawings or embodiments herein are only some embodiments of the present invention and do not represent the entire technical spirit of the present invention. Therefore, it should be understood that various equivalents and modifications that may replace the corresponding configurations may be present at the time of filing this application.

DESCRIPTION OF REFERENCE NUMERALS

10: automatic conveying and feeding facility
30: roll-type material
32: hollow hub
100: roll buffer
110: turntable
112: rotating shaft
120: rod
130: pusher unit
132: pusher frame
134: pusher
200: transfer
210: base frame
220: middle frame
230: column
240: conveying unit
242: rod
244: chuck means
246: pusher unit
248: slider
300: OHT
310: conveying rail
320: rail guided vehicle
322: rod
324: chuck means
325: protruding step
326: pusher unit
328: slider
400: winder port
410: rod

INDUSTRIAL APPLICABILITY

The present disclosure is useful for use as a facility that automatically performs a series of processes including loading, releasing, conveying, and inputting of roll-type materials.

The invention claimed is:

1. An automatic conveying and feeding facility for roll-type materials, the automatic conveying and feeding facility comprising:

a roll buffer configured to receive a roll-type material loaded on a carriage in an X-axis direction and convey the received roll-type material on a YZ plane;

a transfer apparatus configured to receive the roll-type material from the roll buffer in the X-axis direction, move to a set position on an XY plane in a state in which the roll-type material is loaded thereon, and convey the roll-type material upward in a Z-axis direction; and an overhead hoist transport (OHT) configured to receive the roll-type material loaded on the transfer apparatus and having at least one or more rail guided vehicles configured to move the overhead hoist transport to a destination along a trajectory of a conveying rail, wherein movement of the roll-type material between the roll buffer and the transfer apparatus and between the transfer apparatus and the rail guided vehicle occurs in a rod-to-rod manner.

2. The automatic conveying and feeding facility of claim 1, wherein each of the roll buffer, the transfer apparatus, and the rail guided vehicle include a rod configured to be inserted into a hollow hub of the roll-type material.

3. The automatic conveying and feeding facility of claim 2, wherein each of the roll buffer, the transfer apparatus, and the rail guided vehicle include a pusher unit configured to push the roll-type material loaded thereon.

4. The automatic conveying and feeding facility of claim 3, wherein movement of the roll-type material between the roll buffer and the transfer apparatus occurs when the rod disposed on the roll buffer and the rod disposed on the transfer apparatus are aligned with each other, and the pusher unit of the roll buffer is configured to push the roll-type material toward the transfer apparatus.

5. The automatic conveying and feeding facility of claim 3, wherein:

the roll buffer includes a turntable disposed on the YZ plane and at least two or more rods are disposed on a circumference of the turntable;

the turntable is configured to rotate about a rotating shaft extending in the X-axis direction that passes through a center of the circumference such that the roll-type material loaded onto the at least two or more rods approaches the transfer apparatus due to rotation of the turntable.

6. The automatic conveying and feeding facility of claim 5, wherein a plurality of roll-type materials are loaded onto the at least two or more rods of the turntable.

7. The automatic conveying and feeding facility of claim 6, wherein:

the pusher unit of the roll buffer includes a pusher frame configured to linearly move in a Y-axis direction and a pusher configured to linearly move in the X-axis direction along the pusher frame; and the pusher is configured to push a rearmost portion of the plurality of roll-type materials loaded onto the at least two or more rods of the turntable so that one foremost roll-type material is released each time.

8. The automatic conveying and feeding facility of claim 3, wherein the transfer apparatus includes:

a base frame extending in the Y-axis direction;

a middle frame configured to linearly move in the Y-axis direction on the base frame;

a column configured to linearly move in the X-axis direction on the middle frame and extending in the Z-axis direction; and a conveying unit having a rod and configured to linearly move in the Z-axis direction along the column, wherein the pusher unit is disposed on the conveying unit.

9. The automatic conveying and feeding facility of claim 8, wherein the conveying unit is configured to linearly move in the Z-axis direction between the rod of the roll buffer and the rod of the rail guided vehicle.

10. The automatic conveying and feeding facility of claim 3, wherein the pusher unit of the rail guide vehicle is provided at a rear of the rod of the rail guided vehicle and is configured to push the rear of the roll-type material loaded onto the rod of the rail guide vehicle.

11. The automatic conveying and feeding facility of claim 8, wherein:

the conveying unit further includes a slider configured to linearly move both the rod of the conveying unit and the pusher unit of the conveying unit such that the rod of the conveying unit is docked at the rod of the roll buffer or the rod of the rail guided vehicle and connected thereto.

12. The automatic conveying and feeding facility of claim 11, wherein a first chuck configured to press an inner surface of the hollow hub of the roll-type material is disposed onto the rod of the conveying unit.

13. The automatic conveying and feeding facility of claim 10, further comprising a winder port disposed along the trajectory of the conveying rail, wherein the winder port has a rod which is able to be linked to the rod of the rail guided vehicle.

14. The automatic conveying and feeding facility of claim 13, wherein:

the rail guided vehicle further includes a slider configured to linearly move both the rod of the rail guided vehicle and the pusher unit of the rail guided vehicle such that the rod of the rail guided vehicle is docked at the rod of the winder port and connected thereto.

15. The automatic conveying and feeding facility of claim 14, wherein a second chuck configured to press the inner surface of the hollow hub of the roll-type material is disposed onto the rod of the rail guided vehicle.

16. The automatic conveying and feeding facility of claim 15, wherein a protruding step forming a catching step for the hollow hub is disposed onto an end portion of the second chuck.

17. The automatic conveying and feeding facility of claim 3, wherein movement of the roll-type material between the transfer apparatus and the rail guided vehicle occurs when the rod disposed on the transfer apparatus and the rod disposed on the rail guided vehicle are aligned with each other and the pusher unit of the transfer apparatus is configured to push the roll-type material toward the rail guided vehicle.

* * * * *